US012418326B2

(12) United States Patent
Liao et al.

(10) Patent No.: US 12,418,326 B2
(45) Date of Patent: Sep. 16, 2025

(54) WIRELESS COMMUNICATION DEVICE AND CONTROL METHOD THEREOF

(71) Applicant: Delta Electronics (Shanghai) CO., LTD, Shanghai (CN)

(72) Inventors: Yongkai Liao, Shanghai (CN); Yibo Wang, Shanghai (CN); Ulrich Richter, Shanghai (CN); Qing Jiang, Shanghai (CN); Xuecong Xu, Shanghai (CN)

(73) Assignee: Delta Electronics (Shanghai) CO., LTD., Shanghai (CN)

( * ) Notice: Subject to any disclaimer, the term of this patent is extended or adjusted under 35 U.S.C. 154(b) by 385 days.

(21) Appl. No.: 18/173,109

(22) Filed: Feb. 23, 2023

(65) Prior Publication Data
US 2023/0308136 A1 Sep. 28, 2023

(30) Foreign Application Priority Data

Mar. 24, 2022 (CN) .......................... 202210301854.8

(51) Int. Cl.
*H04B 5/79* (2024.01)
*H04B 5/77* (2024.01)

(52) U.S. Cl.
CPC ................. *H04B 5/79* (2024.01); *H04B 5/77* (2024.01)

(58) Field of Classification Search
CPC ..................................... H04B 5/79; H04B 5/77
See application file for complete search history.

(56) References Cited

U.S. PATENT DOCUMENTS

2014/0176306 A1* 6/2014 Lee ..................... G06K 7/10237
340/10.1
2016/0336791 A1* 11/2016 Na .......................... H02J 50/12
(Continued)

FOREIGN PATENT DOCUMENTS

CN       102738530 A    10/2012
CN       103684535 A     3/2014
(Continued)

OTHER PUBLICATIONS

Notice of Allowance dated May 22, 2024 of Chinese Application No. 202210301854.8.
(Continued)

*Primary Examiner* — David Bilodeau
(74) *Attorney, Agent, or Firm* — Qinghong Xu

(57) ABSTRACT

The present disclosure provides a wireless communication device and a control method thereof. The wireless communication device includes a first communication control module and a second communication control module. The method includes: making the first communication control module start to work in a first mode and the second communication control module start to work in a second mode; providing, by the second communication control module, identification information; reading, by the first communication control module, the identification information, and determining whether the identification information is the same as first preset information; if so, switching both the first communication control module and the second communication control module to a third mode, and performing, by the first communication control module and the second communication control module, wireless communication to transmit data; and controlling the wireless power transmission device to perform wireless power transmission with a first preset power.

26 Claims, 12 Drawing Sheets

(56) References Cited

U.S. PATENT DOCUMENTS

| | | | |
|---|---|---|---|
| 2018/0046891 A1* | 2/2018 | Jung | G06K 19/0724 |
| 2019/0258472 A1* | 8/2019 | Kim | H04L 67/34 |
| 2023/0142856 A1* | 5/2023 | Choi | H02J 50/10 |
| | | | 219/624 |

FOREIGN PATENT DOCUMENTS

| | | | |
|---|---|---|---|
| CN | 104184500 | A | 12/2014 |
| CN | 105472534 | A | 4/2016 |
| CN | 106170007 | A | 11/2016 |
| CN | 107105073 | A | 8/2017 |
| CN | 107679604 | A | 2/2018 |
| CN | 109494889 | A | 3/2019 |
| CN | 109698562 | A | 4/2019 |
| CN | 110730021 | A | 1/2020 |
| CN | 111817448 | A | 10/2020 |
| CN | 111884361 | A | 11/2020 |
| CN | 113500977 | A | 10/2021 |
| CN | 114202333 | A | 3/2022 |
| WO | 2020134759 | A1 | 7/2020 |
| WO | 2022001343 | A1 | 1/2022 |

OTHER PUBLICATIONS

1st Office Action dated Mar. 8, 2023 of Chinese Application No. 202210301854.8.
1st Office Action dated Jun. 21, 2025 of Chinese Application No. 2022103032475.

* cited by examiner

WIRELESS COMMUNICATION DEVICE AND CONTROL METHOD THEREOF

CROSS REFERENCE

This application claims priority to Chinese Patent Application No. 202210301854.8, filed on Mar. 24, 2022, the entire contents of which are incorporated herein by reference.

TECHNICAL FIELD

The present disclosure relates to the field of wireless power transmission technologies, and in particular, to a wireless communication device and a control method thereof.

BACKGROUND

Wireless power transmission refers to a process in which energy is transmitted from an energy source to an electrical load, and this process is not completed in a traditional manner with wire, but is achieved by wireless transmission. A wireless power transmission device includes a primary circuit and a secondary circuit. Power is first transmitted from the primary circuit to the secondary circuit, and then transmitted to a load through the secondary circuit. In some applications, the wireless power transmission and communication are not carried out simultaneously, resulting in discontinuous power transmission. In some other applications, the wireless power transmission and communication may be carried out simultaneously, that is, an electromagnetic field for the power transmission and an electromagnetic field for the wireless communication are at the same time and location, which may ensure the continuous transmission of power.

SUMMARY

According to an aspect of the present disclosure, there is provided a method for controlling a wireless communication device. The wireless communication device is used for a wireless power transmission device, and includes a first communication control module, a first antenna coil, a second antenna coil and a second communication control module. The first communication control module is coupled with the first antenna coil, and the second antenna coil is coupled with the second communication control module. The method includes: making the first communication control module start to work in a first mode and the second communication control module start to work in a second mode; providing, by the second communication control module, identification information; reading, by the first communication control module, the identification information, and determining whether the identification information is the same as first preset information; if so, switching working modes of both the first communication control module and the second communication control module to a third mode, and performing, by the first communication control module and the second communication control module, wireless communication to transmit data; and controlling the wireless power transmission device to perform wireless power transmission with a first preset power.

According to another aspect of the present disclosure, there is provided a wireless communication device, including a first communication control module, a first antenna coil, a second antenna coil and a second communication control module; the first communication control module is coupled with the first antenna coil, and the second antenna coil is coupled with the second communication control module; the wireless power transmission device includes a power transmission control and drive module, a transmitting coil, a receiving coil, and a rectification and control module; the power transmission control and drive module is coupled with the transmitting coil, the transmitting coil and the receiving coil are loosely coupled, the receiving coil is coupled with the rectification and control module, and the second communication control module is coupled with the rectification and control module; and wherein the second communication control module starts to work in a second mode and outputs identification information; the first communication control module starts to work in a first mode, receives the identification information and compares the identification information with first preset information; when the identification information is the same as the first preset information, working modes of the first communication control module and the second communication control module are both switched to a third mode, and the first communication control module and the second communication control module perform wireless communication to transmit data; and when the first communication control module and the second communication control module perform the wireless communication, the power transmission control and drive module and the rectification and control module perform wireless power transmission with a first preset power through the transmitting coil and the receiving coil.

BRIEF DESCRIPTION OF THE DRAWINGS

The accompanying drawings here, which are incorporated in and constitute a part of this specification, illustrate embodiments consistent with the present disclosure and, together with the description, serve to explain principles of the present disclosure. It is obvious that the accompanying drawings described below are only some embodiments of the present disclosure, and for the person skilled in the art, other drawings may be obtained without creative labor.

DETAILED DESCRIPTION

Exemplary embodiments will now be described more comprehensively with reference to the accompanying drawings. However, the exemplary embodiments can be implemented in various forms, and should not be construed as being limited to the embodiments set forth herein. Instead, these embodiments are provided for making the present disclosure to be comprehensive and complete, and fully conveying the concepts of the exemplary embodiments to those skilled in the art. The described features, structures, or characteristics may be incorporated in one or more embodiments in any suitable way. In the following description, many specific details are provided to give a full understanding of the embodiments of the present disclosure. However, those skilled in the art will be aware that the technical solution of the present disclosure may be practiced without one or more of the particular details, or other methods, materials, apparatuses, and the like may be employed. In other cases, the well-known technical solutions are not shown or described in detail to avoid obscuring various aspects of the present disclosure. The same reference signs in the figures indicate the same or similar structures, and thus their detailed description will be omitted.

The terms "a", "an", "the", "said" and "at least one" are used to indicate the presence of one or more elements/components/etc.; the terms "include", "have" and "provide" are used to indicate open-ended inclusion and mean that other elements/components/etc. may be existed in addition to the listed elements/components/etc.

Figure 1:
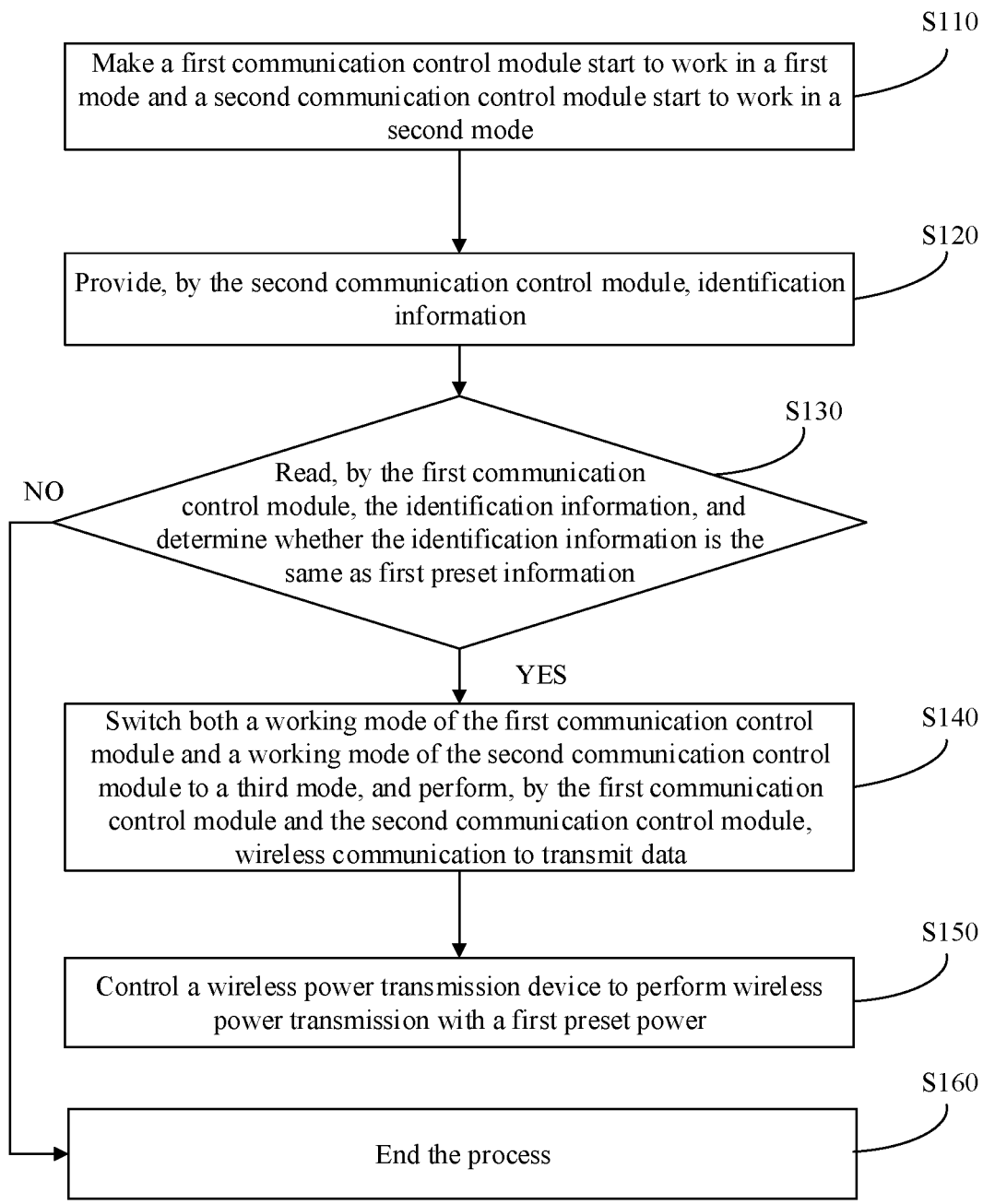
FIG. 1 is a schematic diagram of a method for controlling a wireless communication device disclosed in an embodiment of the present disclosure.

As shown in FIG. 1, the present disclosure discloses a method for controlling a wireless communication device. The wireless communication device is used for a wireless power transmission device, and includes a first communication control module, a first antenna coil, a second antenna coil and a second communication control module. The first communication control module is coupled with the first antenna coil, and the second communication control module is coupled with the second antenna coil. The method for controlling the wireless communication device includes the following steps S110 to S160.

In the step S110, the first communication control module starts to work in a first mode, and the second communication control module starts to work in a second mode. In the step S120, the second communication control module provides identification information.

In the step S130, the first communication control module reads the identification information, and determines whether the identification information is the same as first preset information.

If the identification information is the same as the first preset information, the step S140 is executed, that is, working modes of the first communication control module and the second communication control module are both switched to a third mode, and the first communication control module and the second communication control module perform wireless communication to transmit data.

In the step S150, the wireless power transmission device is controlled to perform wireless power transmission with a first preset power.

If the identification information is not the same as the first preset information, the step S160 is executed, that is, the process is ended.

In embodiments of the present disclosure, the second communication control module outputs the identification information associated with itself in the step S120, the first communication control module authenticates the identification of the second communication control module in the step S130, and the working mode of the first communication control module is adjusted from the first mode to the third mode and the working mode of the second communication control module is adjusted from the second mode to the third mode in the step S140. A wireless information flow is formed between the first communication control module and the second communication control module through an electromagnetic field to perform wireless communication, where the communication between the first communication control module and the second communication control module is usually bidirectional communication, and a fundamental frequency of the electromagnetic field may be 13.56 MHz. The wireless power transmission is from a primary side of the wireless power transmission device to a secondary side of the wireless power transmission device in the step S150. In an embodiment of the present disclosure, the step S110 may include: when the second communication control module does not receive auxiliary electric energy, that is, the second communication control module cannot start to work in the third mode, the second communication control module automatically starts to work in the second mode.

For example, the first mode may be a reader/writer mode, the second mode may be a card emulation mode, and the third mode may be a peer-to-peer mode.

In an embodiment of the present disclosure, on the basis of the embodiment corresponding to FIG. 1, the first communication control module may be located at the primary side of the wireless power transmission device, and the second communication control module may be located at the secondary side of the wireless power transmission device. The wireless power transmission device can be used for the wireless power transmission from the primary side to the secondary side.

In an embodiment of the present disclosure, on the basis of the embodiment corresponding to FIG. 1, the step S110 may be: when a preset condition is satisfied, the first communication control module starts to work in the first mode, and the second communication control module starts to work in the second mode. The preset condition may be that the wireless power transmission device does not perform normal wireless power transmission, that is, the wireless power transmission device cannot start the wireless power transmission. Alternatively, the preset condition may be that the second communication control module cannot start to work in the third mode without receiving the auxiliary electric energy.

Figure 5:
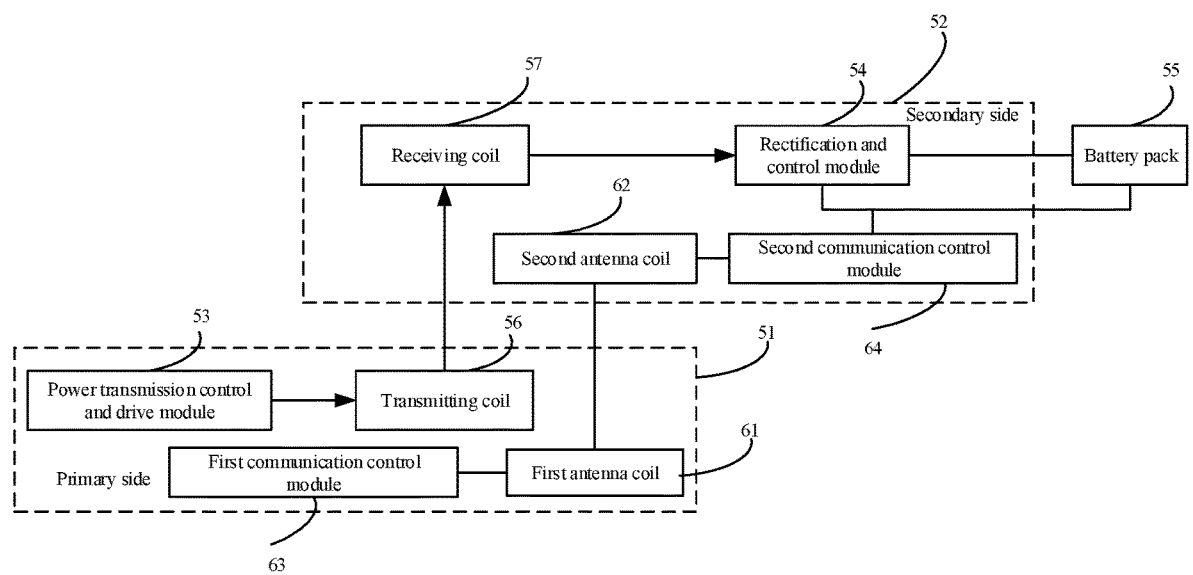
FIG. 5 is a schematic structural diagram of a wireless power transmission device disclosed in an embodiment of the present disclosure.

Embodiments of the present disclosure further disclose a wireless communication device for a wireless power transmission device, and the wireless power transmission device is configured to power a battery pack. As shown in FIG. 5, the wireless power transmission device includes a power transmission control and drive module 53, a transmitting coil 56, a receiving coil 57 and a rectification and control module 54. The power transmission control and drive module 53 and the transmitting coil 56 are located at a primary side 51 of the wireless power transmission device, the receiving coil 57 and the rectification and control module 54 are located at a secondary side 52 of the wireless power transmission device. The power transmission control and drive module 53 is coupled with the transmitting coil 56, and the receiving coil 57 is coupled with the rectification and control module 54. Loose coupling is formed between the transmitting coil 56 and the receiving coil 57. The second communication control module 64 is coupled with the rectification and control module 54. In addition to a battery pack 55, the rectification and control module 54 can also power other types of loads.

In some other embodiments of the present disclosure, the rectification and control module 54 may be coupled with the battery pack 55 for charging the battery pack 55, and the second communication control module 64 may be coupled with the battery pack 55.

A wireless power flow is formed between the transmitting coil 56 and the receiving coil 57 through electromagnetic coupling, realizing wireless power transmission from the primary side 51 to the secondary side 52. A fundamental frequency of the electromagnetic field is generally from tens of kHz to hundreds of kHz. A first communication control module 63 and a first antenna coil 61 of the wireless communication device are located at the primary side 51, while a second communication control module 64 and a second antenna coil 62 of the wireless communication device are located at the secondary side 52. A wireless information flow is formed between the first communication control module and the second communication control module through an electromagnetic field to perform wireless communication, where the communication between the first communication control module and the second communication control module is usually bidirectional communication, and a fundamental frequency of the electromagnetic field may be 13.56 MHz.

Figure 2:
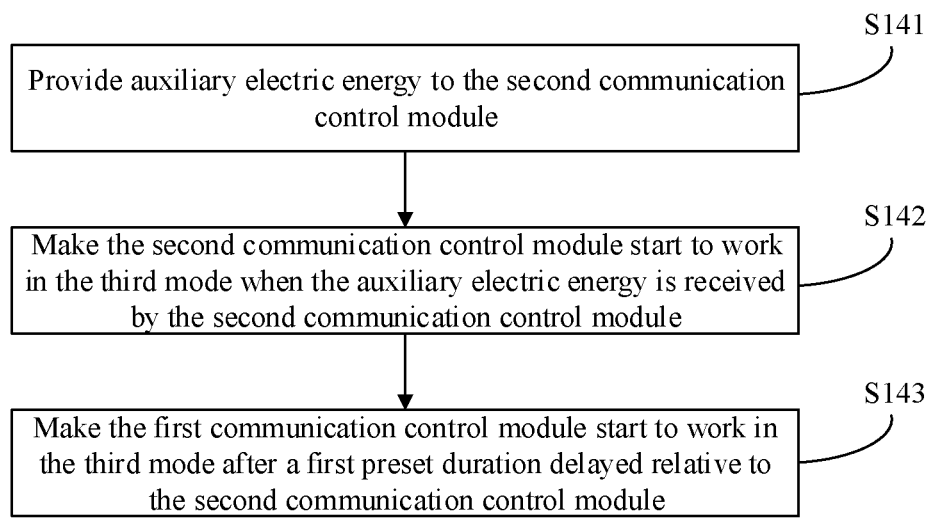
FIG. 2 is a schematic flowchart of step S140 in a method for controlling a wireless communication device disclosed in an embodiment of the present disclosure.

In an embodiment of the present disclosure, as shown in FIG. 2, on the basis of the embodiment corresponding to FIG. 1, the step S140 includes:

in step S141, auxiliary electric energy is provided to the second communication control module;

in step S142, the second communication control module starts to work in the third mode after receiving the auxiliary electric energy; and in step S143, the first communication control module starts to work in the third mode after a first preset duration delayed relative to the second communication control module.

For example, in the step S143, the first communication control module starts to work in the third mode after the first preset duration delayed from the second communication control module starting to work in the third mode.

In an embodiment of the present disclosure, on the basis of the embodiments corresponding to FIG. 2 and FIG. 5, the rectification and control module 54 is coupled with the battery pack 55 for charging the battery pack 55 in the step S141. When a voltage of the battery pack 55 is higher than or equal to a first preset voltage, the auxiliary electric energy can be provided to the second communication control module 64 through the battery pack 55. Otherwise, the power transmission control and drive module 53 and the rectification and control module 54 performs the wireless power transmission with a second preset power through the transmitting coil 56 and the receiving coil 57, and the auxiliary electric energy is provided to the second communication control module 64 through the rectification and control module 54, where the second preset power is lower than the first preset power.

In other embodiments of the present disclosure, on the basis of the embodiments corresponding to FIG. 2 and FIG. 5, in the step S141, the rectification and control module 54 powers other loads, the power transmission control and drive module 53 and the rectification and control module 54 perform the wireless power transmission with the second preset power based on the transmitting coil 56 and the receiving coil 57, and the auxiliary electric energy is provided to the second communication control module 64 through the rectification and control module 54, where the second preset power is lower than the first preset power.

For example, the first preset power is in a normal power range, such as a range from several watts to hundreds of kilowatts, and the second preset power may be several watts or hundreds of milliwatts.

For example, the first preset duration may be 100 ms, which is not limited by the present disclosure.

Figure 3:
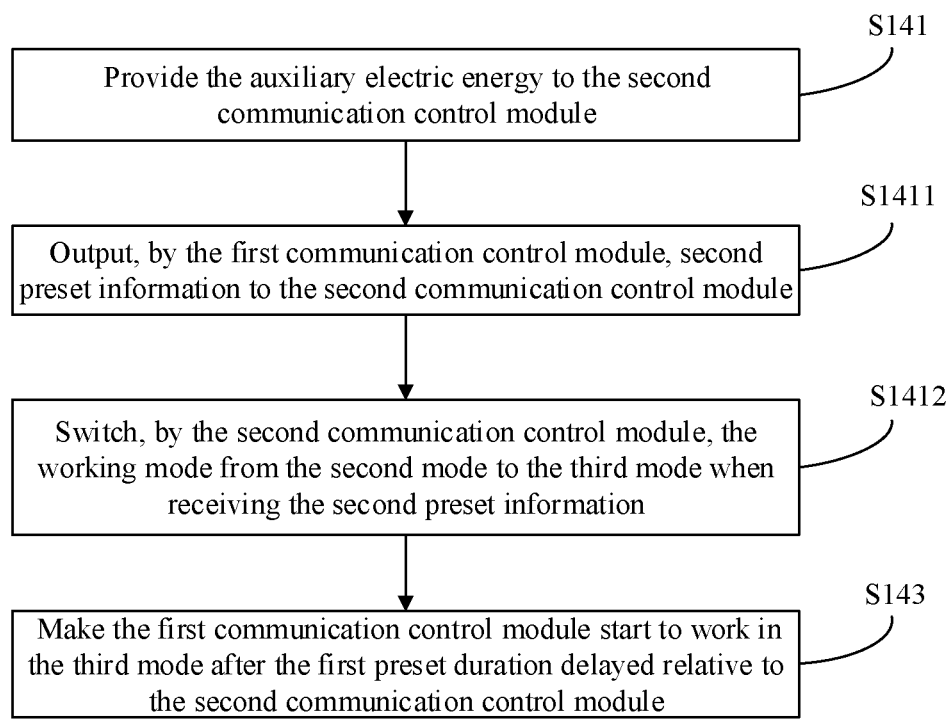
FIG. 3 is a schematic flowchart of step S140 in a method for controlling a wireless communication device disclosed in an embodiment of the present disclosure.

In an embodiment of the present disclosure, as shown in FIG. 3, after the step S141, the method for controlling the wireless communication device further includes:

in step S1411, the first communication control module outputs second preset information to the second communication control module; and in step S1412, when receiving the second preset information, the second communication control module switches the working mode from the second mode to the third mode.

For example, in the step S1411, when the power supply of the second communication control module is established, the first communication control module outputs the second preset information to the second communication control module, and the second preset information includes control information for switching the working mode of the second communication control module from the second mode to the third mode.

In an embodiment of the present disclosure, on the basis of the embodiments corresponding to FIG. 3 and FIG. 5, the rectification and control module 54 is coupled with the battery pack 55 for charging the battery pack 55 in the step S141. When the voltage of the battery pack 55 is higher than or equal to the first preset voltage, the auxiliary electric energy can be provided to the second communication control module 64 through the battery pack 55. Otherwise, the power transmission control and drive module 53 and the rectification and control module 54 performs the wireless power transmission with the second preset power through the transmitting coil 56 and the receiving coil 57, and the auxiliary electric energy is provided to the second communication control module 64 through the rectification and control module 54, where the second preset power is lower than the first preset power.

In other embodiments of the present disclosure, on the basis of the embodiments corresponding to FIG. 2 and FIG. 5, in the step S141, the rectification and control module 54 powers other loads, the power transmission control and drive module 53 and the rectification and control module 54 perform the wireless power transmission with the second preset power through the transmitting coil 56 and the receiving coil 57, and the auxiliary electric energy is provided to the second communication control module 64 through the rectification and control module 54, where the second preset power is lower than the first preset power.

Figure 4:
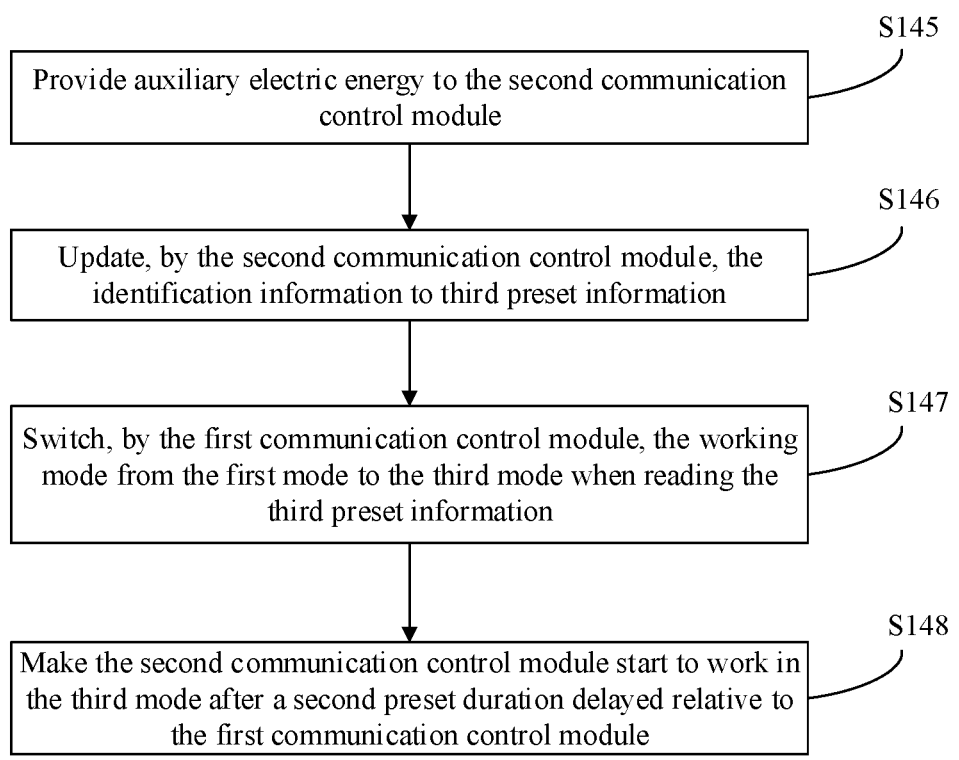
FIG. 4 is a schematic flowchart of step S140 in a method for controlling a wireless communication device disclosed in an embodiment of the present disclosure.

In an embodiment of the present disclosure, as shown in FIG. 4, on the basis of the embodiment corresponding to FIG. 1, the step S140 includes:

in step S145, auxiliary electric energy is provided to the second communication control module;

in step S146, the second communication control module updates the identification information to third preset information;

in step S147, when reading the third preset information, the first communication control module switches the working mode from the first mode to the third mode; and in step S148, the second communication control module starts to work in the third mode after a second preset duration delayed relative to the first communication control module.

For example, in the step S146, when the power supply of the second communication control module is established, the second communication control module updates original identification information to the third preset information, which means that the power supply of the second communication control module has been established, and the third preset information includes control information for switching the working mode of the first communication control module from the first mode to the third mode. The second communication control module starts to work in the third mode after the first preset duration delayed from the first communication control module starting to work in the third mode.

In an embodiment of the present disclosure, on the basis of the embodiments corresponding to FIG. 4 and FIG. 5, in the step S141, when the voltage of the battery pack 55 is higher than or equal to the first preset voltage, the auxiliary electric energy can be provided to the second communication control module 64 through the battery pack 55. Otherwise, the power transmission control and drive module 53 and the rectification and control module 54 performs the wireless power transmission with the second preset power through the transmitting coil 56 and the receiving coil 57, and the auxiliary electric energy is provided to the second communication control module 64 through the rectification and control module 54, where the second preset power is lower than the first preset power.

In an embodiment of the present disclosure, on the basis of the embodiment corresponding to FIG. 1 or FIG. 2 or FIG. 3 or FIG. 4, as shown in FIG. 5, the first antenna coil 61 is arranged at a side of the transmitting coil 56, for example, the first antenna coil 61 is arranged at a side of a surface of the transmitting coil 56 surface; and the second antenna coil 62 is arranged at a side of the receiving coil 57, for example, the second antenna coil 62 is arranged at a side of a surface of the receiving coil 57. The first antenna coil 61 and the second antenna coil 62 are located between the transmitting coil 56 and the receiving coil 57. The first antenna coil 61 is coupled with the first communication control module 63, and the second antenna coil 62 is coupled with the second communication control module 64.

In embodiments of the present disclosure, the wireless power flow is formed between the transmitting coil 56 and the receiving coil 57 through the electromagnetic coupling, realizing the wireless power transmission from the primary side 51 to the secondary side 52. A wireless information flow is formed between the first antenna coil and the second antenna coil through an electromagnetic field to perform near field wireless communication, and information transfer in the communication can usually be carried out bidirectionally. An electromagnetic field for the near field communication falls within an electromagnetic field for the power communication, and a fundamental frequency of the electromagnetic field for the near field communication may be a NFC standard frequency.

The present disclosure can realize that the wireless power transmission and the near field communication are carried out simultaneously, the electromagnetic field for the power transmission and the electromagnetic field for the wireless communication are at the same time and location, and the power transmission is continuous.

In an embodiment of the present disclosure, on the basis of the embodiments corresponding to FIG. 1 and FIG. 5, the first antenna coil 61 and the second antenna coil 62 are both NFC antenna coils for realizing the near field communication.

Figure 6:
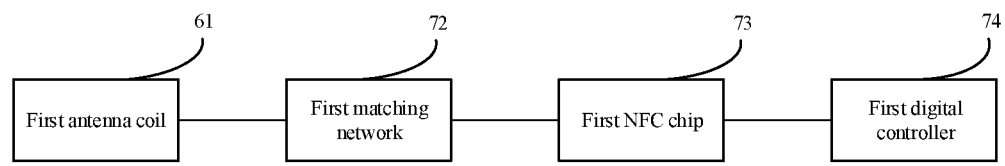
FIG. 6 is a schematic structural diagram of a wireless communication device disclosed in an embodiment of the present disclosure.

In an embodiment of the present disclosure, on the basis of the embodiment corresponding to FIG. 1, as shown in FIG. 6, the first communication control module 63 includes a first matching network 72, a first NFC chip 73 and a first digital controller 74. The first matching network 72 is coupled with the first antenna coil 61, and the first NFC chip 73 is coupled with the first matching network 72 and the first digital controller 74, respectively. The first digital controller 74 is configured to control the first NFC chip 73 to start to work in the first mode or the third mode.

For example, the first NFC chip 73 needs to satisfy that it can start to work in the peer-to-peer mode or the reader/writer mode, and when the wireless power transmission device does not perform the normal wireless power transmission, it can start to work in the reader/writer mode. After the working mode of the second communication control module 64 is switched from the second mode to the third mode, the first digital controller 74 controls the first NFC chip 73 to switch from the reader/writer mode to the peer-to-peer mode after the first preset duration delayed relative to the second communication control module 64. Alternatively, after the power supply of the second communication control module 64 is established, the second communication control module 64 updates the original identification information to the third preset information, and the first digital controller 74 controls the working mode of the first NFC chip 73 to be switched from the reader/writer mode to the peer-to-peer mode when receiving the third preset information.

Figure 7:
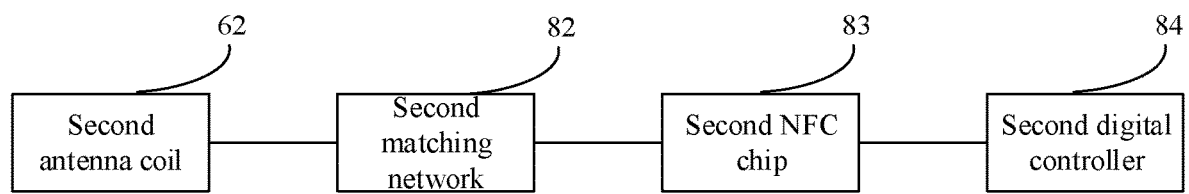
FIG. 7 is a schematic structural diagram of a wireless communication device disclosed in another embodiment of the present disclosure.

In an embodiment of the present disclosure, on the basis of the embodiment corresponding to FIG. 1, as shown in FIG. 7, the second communication control module 64 includes a second matching network 82, a second NFC chip 83 and a second digital controller 84. The second matching network 82 is coupled with the second antenna coil 62, and the second NFC chip 83 is coupled with the second matching network 82 and the second digital controller 84, respectively. The second digital controller 84 is configured to control the second NFC chip 83 to start to work in the second mode or the third mode.

Figure 8:
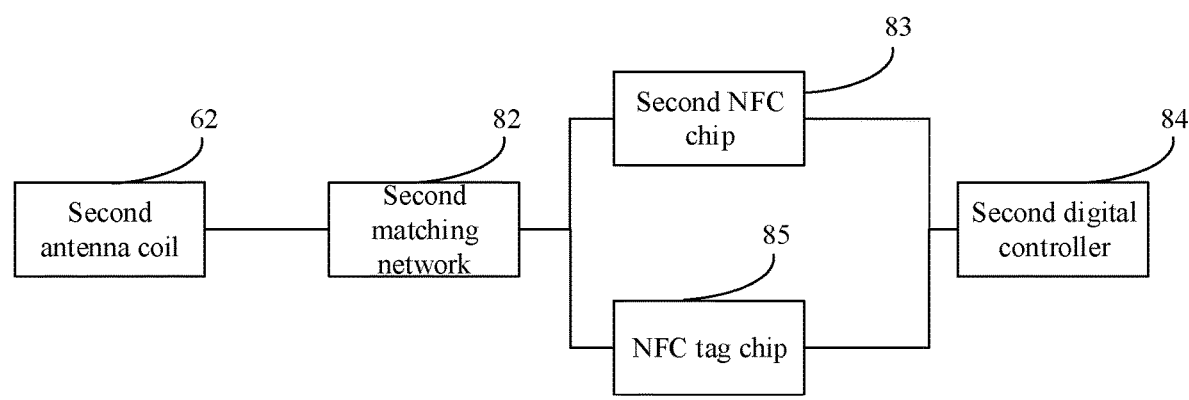
FIG. 8 is a schematic structural diagram of a wireless communication device disclosed in another embodiment of the present disclosure.

In some embodiments of the present disclosure, on the basis of the embodiment corresponding to FIG. 7, as shown in FIG. 8, the second communication control module 64 further includes a NFC tag chip 85 coupled with the second matching network 82 and the second digital controller 84, respectively.

For example, the NFC tag chip 85 can start to work in the card emulation mode without the external power supply. When the power supply of the second digital controller 84 is not established, the wireless information flow is formed between the first antenna coil 61 and the second antenna coil 62 through the electromagnetic field. In this case, the NFC tag chip 85 provides the identification information, such as tag information, and the first communication control module 63 can read the tag information and start identification authentication, that is, determine whether the identification information is the same as the first preset information, if so, determine that the secondary side 52 is a legal secondary side, that is, allow the wireless communication to be established between the first communication control module 63 and the second communication control module 64.

When the power supply of the second digital controller 84 is established, the second digital controller 84 disables the NFC tag chip 85 and enables the second NFC chip 83, and a working mode of the second NFC chip 83 is the peer-to-peer mode. The first digital controller 74 controls the first NFC chip 73 to switch from the reader/writer mode to the peer-to-peer mode after a first preset time delayed from a moment when the second NFC chip 83 starts to work in the peer-to-peer mode. A bidirectional wireless information flow is formed between the first antenna coil 61 and the second antenna coil 62 through the electromagnetic field, and peer-to-peer communication is established between the first communication control module 63 and the second communication control module 64.

In some other embodiments of the present disclosure, when the power supply of the second digital controller 84 is established, the first digital controller 74 controls the first NFC chip 73 to output the second preset information. When receiving the second preset information, the second digital controller 84 controls the second NFC chip 83 to start to work in the peer-to-peer mode. The first digital controller 74 controls the first NFC chip 73 to switch from the reader/writer mode to the peer-to-peer mode after the first preset time delayed from a moment when the switching of the working mode of the second NFC chip 83 is completed.

In some other embodiments of the present disclosure, when the power supply of the second digital controller 84 is established, the second digital controller 84 controls the second NFC chip 83 or the NFC tag chip 85 to output the third preset information. When receiving the third preset information, the first digital controller 74 controls the working mode of the first NFC chip 73 to be switched from the reader/writer mode to the peer-to-peer mode. The second digital controller 84 controls the second NFC chip 83 to start to work in the peer-to-peer mode after a second preset time delayed from a moment when the switching of the working mode of the first NFC chip 73 is completed.

Figure 9:
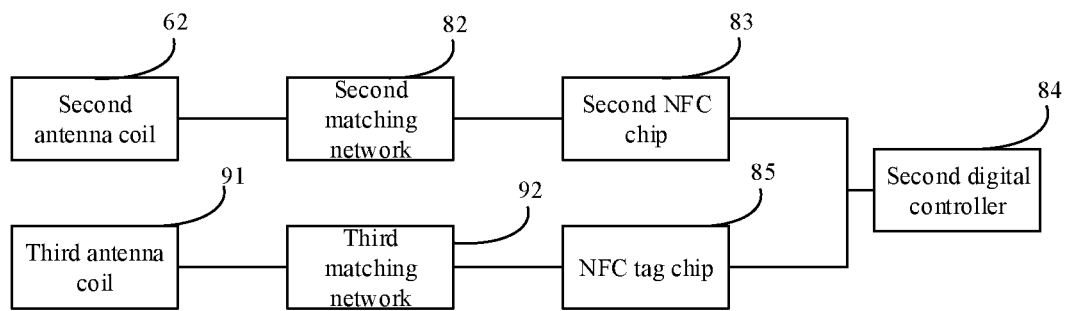
FIG. 9 is a schematic structural diagram of a wireless communication device disclosed in another embodiment of the present disclosure.

In some embodiments of the present disclosure, on the basis of the embodiment corresponding to FIG. 7, as shown in FIG. 9, the wireless communication device further includes a third antenna coil 91. The second communication control module 64 further includes a third matching network 92 and the NFC tag chip 85. The third matching network 92 is coupled with the third antenna coil 91 and the NFC tag chip 85, respectively, and the second digital controller 84 is coupled with the NFC tag chip 85. When receiving the auxiliary electric energy, the second digital controller 84 disables the NFC tag chip 85 and enables the second NFC chip 83. In some embodiments of the present disclosure, the third antenna coil 91 is physically arranged at the side of the receiving coil 57. In some embodiments of the present disclosure, both the second antenna coil 62 and the third antenna coil 91 are arranged at the side of the surface of the receiving coil 57. In some other embodiments of the present disclosure, the second antenna coil 62 and the third antenna coil 91 overlap with each other and the second antenna coil 62 is located between the third antenna coil 91 and the receiving coil 57.

For example, when the power supply of the second digital controller 84 is not established, the first NFC chip 73 starts to work in the reader/writer mode, and the first digital controller 74 can read the identification information (such as the tag information) in the NFC tag chip 85 through the first NFC chip 73, the first antenna coil 61 and the third antenna coil 91.

When the power supply of the second digital controller 84 is established, the second digital controller 84 disables the NFC tag chip 85 and enables the second NFC chip 83, and the second NFC chip 83 starts to work in the peer-to-peer mode. The first digital controller 74 controls the first NFC chip 73 to also switch to the peer-to-peer mode after the first preset time delayed from the moment when the second NFC chip 83 starts to work in the peer-to-peer mode. The bidirectional wireless information flow is formed between the first antenna coil 61 and the second antenna coil 62 through the electromagnetic field, and the peer-to-peer communication is established between the first communication control module 63 and the second communication control module 64.

In some other embodiments of the present disclosure, when the power supply of the second digital controller 84 is established, the first digital controller 74 controls the first NFC chip 73 to output the second preset information. When receiving the second preset information, the second digital controller 84 controls the second NFC chip 83 to start to work in the peer-to-peer mode. The first digital controller 74 controls the first NFC chip 73 to switch from the reader/writer mode to the peer-to-peer mode after the first preset time delayed from the moment when the switching of the working mode of the second NFC chip 83 is completed.

In some other embodiments of the present disclosure, when the power supply of the second digital controller 84 is established, the second digital controller 84 controls the second NFC chip 83 or the NFC tag chip 85 to output the third preset information. When receiving the third preset information, the first digital controller 74 controls the working mode of the first NFC chip 73 to be switched from the reader/writer mode to the peer-to-peer mode. The second digital controller 84 controls the second NFC chip 83 to start to work in the peer-to-peer mode after the second preset time delayed from the moment when the switching of the working mode of the first NFC chip 73 is completed.

Figure 10:
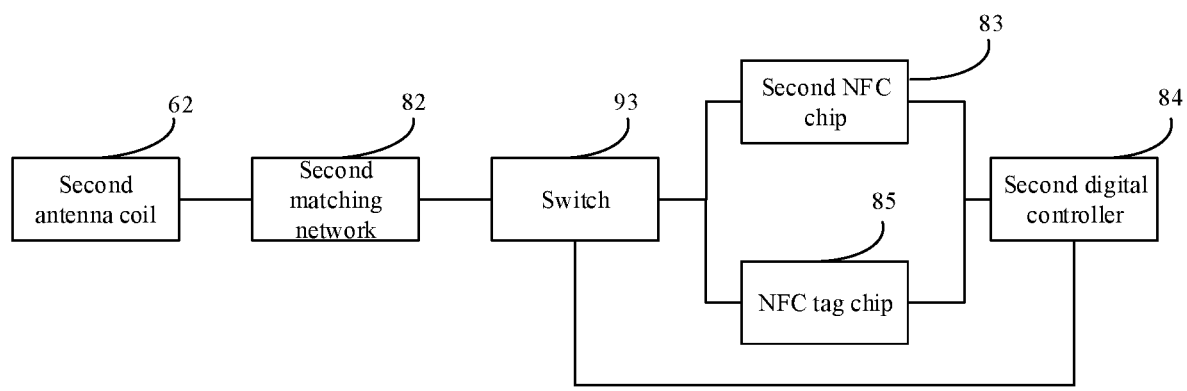
FIG. 10 is a schematic structural diagram of a wireless communication device disclosed in another embodiment of the present disclosure.

In some embodiments of the present disclosure, on the basis of the embodiment corresponding to FIG. 8, as shown in FIG. 10, the second communication control module 64 further includes a switch 93 coupled with the second matching network 82, the second NFC chip 83, the NFC tag chip 85 and the second digital controller 84, respectively. When the second digital controller 84 does not receive the auxiliary electric energy, that is, the power supply of the second digital controller 84 is not established, the second matching network 82 is connected to the NFC tag chip 85 through the switch 93. When the second digital controller 84 receives the auxiliary electric energy, that is, when the power supply of the second digital controller 84 is established, the second matching network 82 is connected to the second NFC chip 83 through the switch 93. The second digital controller 84 can control the switch 93, when the second digital controller 84 receives the auxiliary electric energy, the second digital controller 84 controls the switch 93 to connect a path between the second matching network 82 and the second NFC chip 83 and disconnect a path between the second matching network 82 and the NFC tag chip 85.

Figure 11:
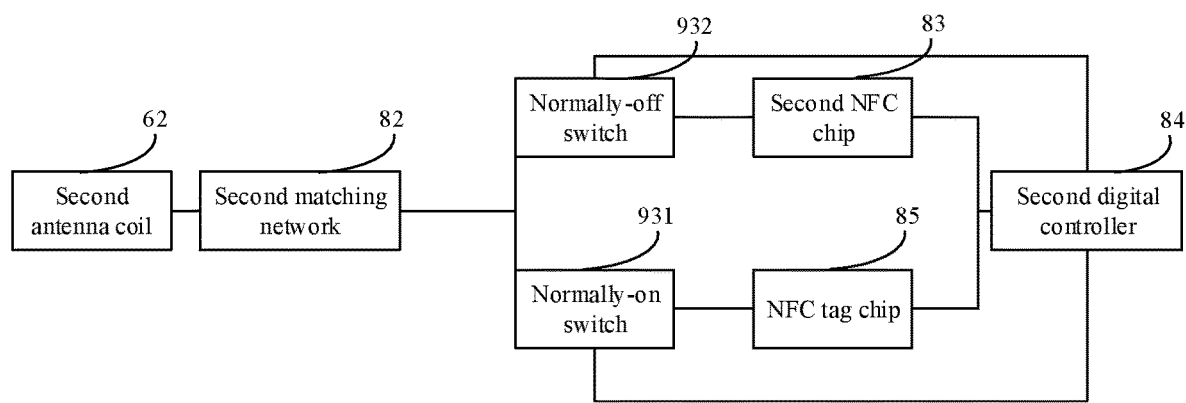
FIG. 11 is a schematic structural diagram of a wireless communication device disclosed in another embodiment of the present disclosure.

In some embodiments of the present disclosure, as shown in FIG. 11, the switch 93 includes a normally-on switch 931 and a normally-off switch 932. The normally-off switch 932 is coupled with the second matching network 82, the second NFC chip 83 and the second digital controller 84, respectively. The normally-on switch 931 is coupled with the second matching network 82, the NFC tag chip 85 and the second digital controller 84, respectively.

When the second digital controller 84 receives the auxiliary electric energy, the second digital controller 84 outputs a first control signal and a second control signal, respectively, the first control signal controls the normally-off switch 932 to be turned on, and the second control signal controls the normally-on switch 931 to be turned off, so that the second matching network 82 is connected to the second NFC chip 83, and the second matching network 82 is disconnected from the NFC tag chip 85.

When the second digital controller 84 does not receive the auxiliary electric energy, the second digital controller 84 stops outputting the first control signal and the second control signal, so that the second matching network 82 is disconnected from the second NFC chip 83, and the second matching network 82 is connected to the NFC tag chip 85.

For example, the normally-on switch and the normally-off switch together constitute the switch 93. The normally-on switch is in a turned-on state without any controlling signal, and is turned off when a controlling signal is applied. A switching logic of the normally-off switch is opposite to that of the normally-on switch.

When the power supply of the second digital controller 84 is not established, neither the normally-on switch nor the normally-off switch in the switch 93 is applied with the controlling signal, so that the normally-on switch is turned on, and the normally-off switch is turned off to make the second matching network 82 connected with the NFC tag chip 85.

When the power supply of the second digital controller 84 is established, the second digital controller 84 respectively applies controlling signals to the normally-on switch and the normally-off switch to make their switching states reversed, that is, the normally-on switch is turned off, while the normally-off switch is turned on, so that the second matching network 82 is connected to the second NFC chip 83.

Figure 12:
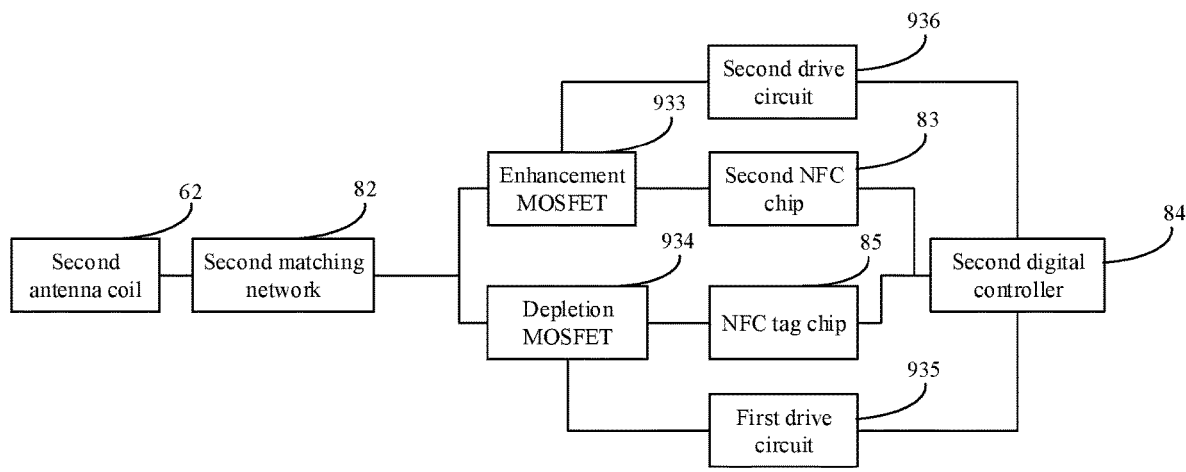
FIG. 12 is a schematic structural diagram of a wireless communication device disclosed in another embodiment of the present disclosure.

In some embodiments of the present disclosure, as shown in FIG. 12, the switch 93 includes depletion Metal-Oxide-Semiconductor Field-Effect Transistors (MOSFETs) 934 connected back-to-back and enhancement MOSFETs 933 connected back-to-back. The enhancement MOSFET 933 is coupled with the second matching network 82, the second NFC chip 83 and the second digital controller 84, respectively, and the depletion MOSFET 934 is coupled with the second matching network 82, the NFC tag chip 85 and the second digital controller 84, respectively.

When the second digital controller 84 receives the auxiliary electric energy, the second digital controller 84 outputs a third control signal and a fourth control signal, respectively, the third control signal controls the enhancement MOSFET 933 to be turned on, and the fourth control signal control the depletion MOSFET 934 to be turned off, so that the second matching network 82 is connected to the second NFC chip 83, and the second matching network 82 is disconnected from the NFC tag chip 85.

When the second digital controller 84 does not receive the auxiliary electric energy, the second digital controller 84 stops outputting the third control signal and the fourth control signal, so that the second matching network 82 is disconnected from the second NFC chip 83, and the second matching network 82 is connected to the NFC tag chip 85.

For example, the depletion MOSFETs 934 connected back-to-back and the enhancement MOSFETs 933 connected back-to-back together constitute the switch 93. A path between a drain and a source of the depletion MOSFET 934 is turned on when no voltage is applied between a gate and the source of the depletion MOSFET 934, and the path between the drain and the source of the depletion MOSFET 934 is turned off when a negative voltage is applied between the gate and the source of the depletion MOSFET 934. A path between a drain and a source of the enhancement MOSFET 933 is turned off when no voltage is applied between a gate and the source of the enhancement MOSFET 933, and the path between the drain and the source of the enhancement MOSFET 933 is turned on when a positive voltage is applied between the gate and the source of the enhancement MOSFET 933.

When the power supply of the second digital controller 84 is not established, the depletion MOSFET 934 and the enhancement MOSFET 933 in the switch 93 are both in a state where no voltage is applied between the gate and the source, so that the patch between the drain and the source of the depletion MOSFET 934 is turned on and the patch between the drain and source of the enhancement MOSFET 933 is turned off, to make the second matching network 82 connected with the NFC tag chip 85.

In embodiments of the present discourse, the second communication control module 64 further includes a first drive circuit 935 and a second drive circuit 936. The first drive circuit 935 is connected with the depletion MOSFET 934 and the second digital controller 84, respectively, and the second drive circuit 936 is connected with the enhancement MOSFET 933 and the second digital controller 84, respectively.

When the power supply of the second digital controller 84 is established, the second digital controller 84 applies the negative voltage between the gate and the source of the depletion MOSFET 934 through the first drive circuit 935, so that the patch between the drain and the source of the depletion MOSFET 934 is turned off, and applies the positive voltage between the gate and the source of the enhancement MOSFET 933 through the second drive circuit 936, so that the patch between the drain and the source of the enhancement MOSFET 933 is turned on, so as to make the second matching network 82 connected with the second NFC chip 83.

Embodiments of the present disclosure further disclose a wireless communication device for a wireless power transmission device. As shown in FIG. 5, the wireless communication device includes a first communication control module 63, a first antenna coil 61, a second antenna coil 62 and a second communication control module 64. The first communication control module 63 is coupled with the first antenna coil 61, and the second antenna coil 62 is coupled with the second communication control module 64. The wireless power transmission device includes a power transmission control and drive module 53, a transmitting coil 56, a receiving coil 57 and a rectification and control module 54. The power transmission control and drive module 53 and the transmitting coil 56 are located at a primary side 51 of the wireless power transmission device, the receiving coil 57 and the rectification and control module 54 are located at a secondary side 52 of the wireless power transmission device. The power transmission control and drive module 53 is coupled with the transmitting coil 56, and the receiving coil 57 is coupled with the rectification and control module 54. Loose coupling is formed between the transmitting coil 56 and the receiving coil 57. The second communication control module 64 is coupled with the rectification and control module 54.

A wireless power flow is formed between the transmitting coil 56 and the receiving coil 57 through electromagnetic coupling, realizing wireless power transmission from a primary side to a secondary side. A fundamental frequency of the electromagnetic field is generally from 10 kHz to 1000 kHz. A wireless information flow is formed between the first antenna coil 61 and the second antenna coil 62 through an electromagnetic field to perform near field wireless communication, and information transfer in the communication can usually be carried out bidirectionally.

The second communication control module 64 starts to work in a second mode and is configured to output identification information, and first communication control module 63 starts to work in a first mode and is configured to read the identification information and determine whether the identification information is the same as first preset information. When the identification information is the same as the first preset information, working modes of the first communication control module 63 and the second communication control module 64 are both switched to a third mode, and the first communication control module 63 and the second communication control module 64 perform wireless communication to transmit data. After the first communication control module 63 and the second communication control module 64 perform the wireless communication, the power transmission control and drive module 53 and the rectification and control module 54 perform wireless power transmission with a first preset power based on the transmitting coil 56 and the receiving coil 57, that is, the transmitting coil 56 performs the wireless power transmission to the receiving coil 57.

In embodiments of the present disclosure, the identification information output by the second communication control module 64 is associated with itself. When the identification information is the same as the first preset information, the working mode of the first communication control module 63 is adjusted from the first mode to the third mode, and the working mode of the second communication control module 64 is adjusted from the second mode to the third mode. After the first communication control module 63 and the second communication control module 64 perform the wireless communication, the wireless power transmission is performed from a side where the first communication control module 63 is located to a side where the second communication control module 64 is located. In a specific implementation, the second communication control module 64 may automatically start to work in the second mode in response to an electric quantity of a battery pack 55 at the side where the second communication control module 64 is located is lower than a first preset threshold.

For example, the first mode may be a reader/writer mode, the second mode may be a card emulation mode, and the third mode may be a peer-to-peer mode. The first preset threshold may be 2%, which is not limited by the present disclosure.

In some embodiments of the present disclosure, when the identification information is the same as the first preset information and the second communication control module receives auxiliary electric energy, the second communication control module updates the identification information to third preset information. When reading the third preset information, the first communication control module switches the working mode from the first mode to the third mode, and the second communication control module switches the working mode from the second mode to the third mode after a second preset duration delayed relative to the first communication control module.

In some embodiments of the present disclosure, the first communication control module may be located at the primary side, and the second communication control module 64 may be located at the secondary side. The wireless power transmission device can be used for the wireless power transmission from the primary side to the secondary side.

In some embodiments of the present disclosure, when a preset condition is satisfied, the first communication control module starts to work in the first mode, and the second communication control module 64 starts to work in the second mode. The preset condition may be that the wireless power transmission device does not perform normal wireless power transmission, that is, the wireless power transmission device cannot start the wireless power transmission, or can start the wireless power transmission, but a power of the wireless power transmission is less than the first preset power. The failure of the wireless power transmission device to start the wireless power transmission may be that the side where the first communication control module is located cannot start the wireless power transmission. Alternatively, the preset condition may be that the first communication control module does not receive a communication response signal from the second communication control module 64.

In some embodiments of the present disclosure, the wireless power transmission device is configured to power the battery pack. When a voltage of the battery pack is higher than or equal to a first preset voltage, the auxiliary electric energy is provided to the second communication control module through the battery pack. When the voltage of the battery pack is lower than the first preset voltage, the power transmission control and drive module and the rectification and control module perform wireless power transmission with a second preset power through the transmitting coil and the receiving coil, and the auxiliary electric energy is provided to the second communication control module through the rectification and control module, where the second preset power is lower than the first preset power.

When the identification information is the same as the first preset information and the second communication control module 64 receives the auxiliary electric energy, the second communication control module 64 switches the working mode from the second mode to the third mode. The first communication control module switches the working mode from the first mode to the third mode after a first preset duration delayed relative to the second communication control module 64, that is, the first communication control module starts to work in the third mode after the first preset duration delayed from the second communication control module 64 starting to work in the third mode. The auxiliary electric energy may be electric energy transmitted with the second preset power, and the second preset power is lower than the first preset power.

In some embodiments of the present disclosure, when the identification information is the same as the first preset information and the second communication control module 64 receives the auxiliary electric energy, the first communication control module sends preset information to the second communication control module 64. The second communication control module 64 switches the working mode from the second mode to the third mode after receiving the preset information. The first communication control module switches the working mode from the first mode to the third mode after the first preset duration delayed relative to the second communication control module 64.

For example, the first preset duration may be 5 seconds, and the second preset power may be 10 w, which is not limited by the present disclosure.

In some embodiments of the present disclosure, the wireless power transmission device is configured to power the battery pack 55. The wireless power transmission device provides the auxiliary electric energy to the second communication control module 64 through the battery pack 55. When the identification information is the same as the first preset information and the second communication control module 64 receives the auxiliary electric energy, the second communication control module 64 switches the working mode from the second mode to the third mode.

In some embodiments of the present disclosure, referring to the above FIG. 5, the wireless power transmission device is configured to power the battery pack 55. The rectification and control module 54 is coupled with the battery pack 55, and the second communication control module 64 is coupled with the battery pack 55 and the rectification and control module 54, respectively.

In embodiments of the present disclosure, when the voltage of the battery pack 55 is higher than or equal to the first preset voltage, the auxiliary electric energy is provided to the second communication control module 64 through the battery pack 55. Otherwise, the auxiliary electric energy is received by the rectification and control module 54 and provided to the second communication control module 64, that is, the wireless power transmission device transmits the auxiliary electric energy to the rectification and control module 54 based on the power transmission control and drive module 53, so as to establish the power supply to the second communication control module 64.

When the identification information is the same as the first preset information and the second communication control module 64 receives the auxiliary electric energy, the second communication control module 64 switches the working mode from the second mode to the third mode.

In some embodiments of the present disclosure, referring to the above FIG. 7, the second communication control module 64 includes a second matching network 82, a second NFC chip 83 and a second digital controller 84. The second matching network 82 is coupled with the second antenna coil 62, and the second NFC chip 83 is coupled with the second matching network 82 and the second digital controller 84, respectively. The second digital controller 84 is configured to control the second NFC chip 83 to start to work in the second mode or the third mode.

In some embodiments of the present disclosure, referring to the above FIG. 9, the wireless communication device further includes a third antenna coil 91. The second communication control module 64 further includes a third matching network 92 and the NFC tag chip 85. The third matching network 92 is coupled with the third antenna coil 91, the NFC tag chip 85 is coupled with the third matching network 92, and the second digital controller 84 is coupled with the NFC tag chip 85. When receiving the auxiliary electric energy, the second digital controller 84 disables the NFC tag chip 85 and enables the second NFC chip 83, so that the working mode of the second communication control module 64 is switched from the second mode to the third mode.

For example, when the power supply of the second digital controller 84 is not established, a wireless information flow is formed between the first antenna coil 61 and the third antenna coil 91 through an electromagnetic field, and the first communication control module can read tag information in the NFC tag chip 85.

When the power supply of the second digital controller 84 is established, the second digital controller 84 disables the NFC tag chip 85 and enables the second NFC chip 83, and the second NFC chip 83 starts to work in the peer-to-peer mode, and after the first NFC chip 73 is also switched to the peer-to-peer mode, a bidirectional wireless information flow is formed between the first antenna coil 61 and the second antenna coil 62 through an electromagnetic field, and peer-to-peer communication is established between the first communication control module and the second communication control module 64.

In some embodiments of the present disclosure, the first antenna coil is arranged at a side of the transmitting coil, the second antenna coil is arranged at a side of the receiving coil, and the first antenna coil and the second antenna coil are located between the transmitting coil and the receiving coil.

In some embodiments of the present disclosure, referring to the above FIG. 8, the second communication control module 64 further includes the NFC tag chip 85 coupled between the second matching network 82 and the second digital controller 84.

For example, the NFC tag chip 85 can start to work in the card emulation mode without the external power supply. When the power supply of the second digital controller 84 is not established, the wireless information flow is formed between the first antenna coil 61 and the second antenna coil 62 through the electromagnetic field, and the first communication control module can read the tag information in the NFC tag chip 85.

When the power supply of the second digital controller 84 is established, the second digital controller 84 disables the NFC tag chip 85 and enables the second NFC chip 83, and the second NFC chip 83 starts to work in the peer-to-peer mode, and after the first NFC chip 73 is also switched to the peer-to-peer mode, a bidirectional wireless information flow is formed between the first antenna coil 61 and the second antenna coil 62 through an electromagnetic field, and peer-to-peer communication is established between the first communication control module and the second communication control module 64.

In some embodiments of the present disclosure, referring to the above FIG. 10, the second communication control module 64 further includes a switch 93 coupled with the second matching network 82, the second NFC chip 83, the NFC tag chip 85 and the second digital controller 84, respectively. When the second digital controller 84 does not receive the auxiliary electric energy, that is, the power supply of the second digital controller 84 is not established, the second matching network 82 is connected to the NFC tag chip 85 through the switch 93. When the second digital controller 84 receives the auxiliary electric energy, that is, when the power supply of the second digital controller 84 is established, the second matching network 82 is connected to the second NFC chip 83 through the switch 93. The second digital controller 84 can control the switch 93, when the second digital controller 84 receives the auxiliary electric energy, the second digital controller 84 controls the switch 93 to connect a path between the second matching network 82 and the second NFC chip 83 and disconnect a path between the second matching network 82 and the NFC tag chip 85.

In some embodiments of the present disclosure, referring to the above FIG. 11, the switch 93 includes a normally-on switch 931 and a normally-off switch 932. The normally-off switch 932 is coupled with the second matching network 82, the second NFC chip 83 and the second digital controller 84, respectively. The normally-on switch 931 is coupled with the second matching network 82, the NFC tag chip 85 and the second digital controller 84, respectively.

When the second digital controller 84 receives the auxiliary electric energy, the second digital controller 84 outputs a first control signal and a second control signal, respectively, the first control signal controls the normally-off switch 932 to be turned on, and the second control signal controls the normally-on switch 931 to be turned off, so that the second matching network 82 is connected to the second NFC chip 83, and the second matching network 82 is disconnected from the NFC tag chip 85.

When the second digital controller 84 does not receive the auxiliary electric energy, the second digital controller 84 stops outputting the first control signal and the second control signal, so that the second matching network 82 is disconnected from the second NFC chip 83, and the second matching network 82 is connected to the NFC tag chip 85.

For example, the normally-on switch and the normally-off switch together constitute the switch 93. The normally-on switch is in a turned-on state without any controlling signal, and is turned off when a controlling signal is applied. A switching logic of the normally-off switch is opposite to that of the normally-on switch.

When the power supply of the second digital controller 84 is not established, neither the normally-on switch nor the normally-off switch in the switch 93 is applied with the controlling signal, so that the normally-on switch is turned on, and the normally-off switch is turned off to make the second matching network 82 connected with the NFC tag chip 85.

When the power supply of the second digital controller 84 is established, the second digital controller 84 respectively applies controlling signals to the normally-on switch and the normally-off switch to make their switching states reversed, that is, the normally-on switch is turned off, while the normally-off switch is turned on, so that the second matching network 82 is connected to the second NFC chip 83.

In some embodiments of the present disclosure, referring to the above FIG. 12, the switch 93 includes depletion MOSFETs 934 connected back-to-back and enhancement MOSFETs 933 connected back-to-back. The enhancement MOSFET 933 is coupled with the second matching network 82, the second NFC chip 83 and the second digital controller 84, respectively, and the depletion MOSFET 934 is coupled with the second matching network 82, the NFC tag chip 85 and the second digital controller 84, respectively.

When the second digital controller 84 receives the auxiliary electric energy, the second digital controller 84 outputs a third control signal and a fourth control signal, respectively, the third control signal controls the enhancement MOSFET 933 to be turned on, and the fourth control signal control the depletion MOSFET 934 to be turned off, so that the second matching network 82 is connected to the second NFC chip 83, and the second matching network 82 is disconnected from the NFC tag chip 85.

When the second digital controller 84 does not receive the auxiliary electric energy, the second digital controller 84 stops outputting the third control signal and the fourth control signal, so that the second matching network 82 is disconnected from the second NFC chip 83, and the second matching network 82 is connected to the NFC tag chip 85.

For example, the depletion MOSFETs 934 connected back-to-back and the enhancement MOSFETs 933 connected back-to-back together constitute the switch 93. A path between a drain and a source of the depletion MOSFET 934 is turned on when no voltage is applied between a gate and the source of the depletion MOSFET 934, and the path between the drain and the source of the depletion MOSFET 934 is turned off when a negative voltage is applied between the gate and the source of the depletion MOSFET 934. A path between a drain and a source of the enhancement MOSFET 933 is turned off when no voltage is applied between a gate and the source of the enhancement MOSFET 933, and the path between the drain and the source of the enhancement MOSFET 933 is turned on when a positive voltage is applied between the gate and the source of the enhancement MOSFET 933.

When the power supply of the second digital controller 84 is not established, the depletion MOSFET 934 and the enhancement MOSFET 933 in the switch 93 are both in a state where no voltage is applied between the gate and the source, so that the patch between the drain and the source of the depletion MOSFET 934 is turned on and the patch between the drain and source of the enhancement MOSFET 933 is turned off, to make the second matching network 82 connected with the NFC tag chip 85.

In embodiments of the present discourse, the second communication control module 64 includes a first drive circuit 935 and a second drive circuit 936. The first drive circuit 935 is connected with the depletion MOSFET 934 and the second digital controller 84, respectively, and the second drive circuit 936 is connected with the enhancement MOSFET 933 and the second digital controller 84, respectively.

When the power supply of the second digital controller 84 is established, the second digital controller 84 applies the negative voltage between the gate and the source of the depletion MOSFET 934 through the first drive circuit 935, so that the patch between the drain and the source of the depletion MOSFET 934 is turned off, and applies the positive voltage between the gate and the source of the enhancement MOSFET 933 through the second drive circuit 936, so that the patch between the drain and the source of the enhancement MOSFET 933 is turned on, so as to make the second matching network 82 connected with the second NFC chip 83.

In some embodiments of the present disclosure, the first antenna coil 61 is physically arranged above the transmitting coil 56, and the second antenna coil 62 is physically arranged above the receiving coil 57. A wireless information flow is formed between the first antenna coil 61 and the second antenna coil 62 through an electromagnetic field to perform near field wireless communication, and information transfer in the communication can usually be carried out bidirectionally. An electromagnetic field for the near field communication falls within an electromagnetic field for the power communication, and a fundamental frequency of the electromagnetic field for the near field communication may be a NFC standard frequency.

In some embodiments of the present disclosure, both the first antenna coil 61 and the second antenna coil 62 are NFC antenna coils.

In some embodiments of the present disclosure, referring to the above FIG. 6, the first communication control module includes a first matching network 72, a first NFC chip 73 and a first digital controller 74. The first matching network 72 is coupled with the first antenna coil 61, and the first NFC chip 73 is coupled with the first matching network 72 and the first digital controller 74, respectively. The first digital controller 74 is configured to control the first NFC chip 73 to start to work in the first mode or the third mode.

For example, for a condition that the first NFC chip 73 needs to satisfy, reference may be made to the descriptions in the above corresponding method embodiments, which is not repeated here by the present disclosure.

It should be noted that all the above-mentioned embodiments disclosed in the present disclosure can be freely combined, and the technical solutions obtained though combination are still within the protection scope of the present disclosure.

To sum up, the wireless communication device and the control method thereof disclosed in the present disclosure have at least the following advantages:

in the wireless communication device and the control method thereof disclosed in the above embodiments of the present disclosure, in a scenario where the wireless power transmission device does not perform the normal wireless power transmission, firstly, the first communication control module is made start to work in the first mode, and the second communication control module is made start to work in the second mode. When the identification of the second communication control module is successfully authenticated by the first communication control module, both the first communication control module and the second communication control module are switched to the third mode, and the wireless communication between the first communication control module and the second communication control module is established. Then the normal wireless power transmission is performed, and the wireless communication is maintained during the wireless power transmission. The present disclosure can realize simultaneous wireless power transmission and wireless communication, and continuous power transmission.

The above content is a further detailed description of the present disclosure in combination with specific embodiments, and it cannot be concluded that the implementation of the present disclosure is limited to such description. For a person of ordinary skill in the art of the present disclosure, several simple deductions or substitutions may be made without departing from the concept of the present disclosure, all of which should be considered as falling within the scope of protection of the present disclosure.

What is claimed is:

1. A method for controlling a wireless communication device, wherein the wireless communication device is used for a wireless power transmission device, and comprises a first communication control module, a first antenna coil, a second antenna coil and a second communication control module, the first communication control module is coupled with the first antenna coil, and the second antenna coil is coupled with the second communication control module; and the method comprises:
   making the first communication control module start to work in a first mode and the second communication control module start to work in a second mode;
   providing, by the second communication control module, identification information;
   reading, by the first communication control module, the identification information, and determining whether the identification information is the same as first preset information;
   if so, switching both a working mode of the first communication control module and a working mode of the second communication control module to a third mode, and performing by the first communication control module and the second communication control module, wireless communication to transmit data; and
   controlling the wireless power transmission device to perform wireless power transmission with a first preset power.

2. The method according to claim 1, wherein the switching both the working mode of the first communication control module and the working mode of the second communication control module to the third mode comprises:
   providing auxiliary electric energy to the second communication control module;
   making the second communication control module start to work in the third mode; and
   making the first communication control module start to work in the third mode after a first preset duration delayed relative to the second communication control module.

3. The method according to claim 2, wherein after the providing the auxiliary electric energy to the second communication control module, the method comprises:
   outputting, by the first communication control module, second preset information to the second communication control module; and
   switching, by the second communication control module, the working mode from the second mode to the third mode when receiving the second preset information.

4. The method according to claim 1, wherein the switching both the working mode of the first communication control module and the working mode of the second communication control module to the third mode comprises:
   providing auxiliary electric energy to the second communication control module;
   updating, by the second communication control module, the identification information to third preset information;
   switching, by the first communication control module, the working mode from the first mode to the third mode when reading the third preset information; and
   making the second communication control module start to work in the third mode after a second preset duration delayed relative to the first communication control module.

5. The method according to claim 2, wherein energy is transferred to a battery pack by the wireless power transmission device, and the wireless power transmission device comprises a power transmission control and drive module, a transmitting coil, a receiving coil and a rectification and control module;
   the power transmission control and drive module is coupled with the transmitting coil, the receiving coil is coupled with the rectification and control module, the transmitting coil and the receiving coil are loosely coupled, the second communication control module is coupled with the rectification and control module, and the battery pack is coupled with the rectification and control module and the second communication control module, respectively; and
   the providing the auxiliary electric energy to the second communication control module comprises:
   when a voltage of the battery pack is higher than or equal to a first preset voltage, providing the auxiliary electric energy to the second communication control module through the battery pack; and
   when the voltage of the battery pack is lower than the first preset voltage, performing, by the power transmission control and drive module and the rectification and control module, the wireless power transmission with a second preset power through the transmitting coil and the receiving coil, and providing the auxiliary electric energy to the second communication control module through the rectification and control module;

wherein the second preset power is lower than the first preset power.

6. The method according to claim 2, wherein the wireless power transmission device comprises a power transmission control and drive module, a transmitting coil, a receiving coil and a rectification and control module;
the power transmission control and drive module is coupled with the transmitting coil, the receiving coil is coupled with the rectification and control module, the transmitting coil and the receiving coil are loosely coupled, and the second communication control module is coupled with the rectification and control module; and
the providing the auxiliary electric energy to the second communication control module comprises:
performing, by the power transmission control and drive module and the rectification and control module, the wireless power transmission with a second preset power through the transmitting coil and the receiving coil, and providing the auxiliary electric energy to the second communication control module through the rectification and control module; and
wherein the second preset power is lower than the first preset power.

7. The method according to claim 1, wherein the wireless power transmission device comprises a power transmission control and drive module, a transmitting coil, a receiving coil and a rectification and control module;
the power transmission control and drive module is coupled with the transmitting coil, the receiving coil is coupled with the rectification and control module, the transmitting coil and the receiving coil are loosely coupled, and the second communication control module is coupled with the rectification and control module; and
the first antenna coil is arranged at a side of the transmitting coil, the second antenna coil is arranged at a side of the receiving coil, and the first antenna coil and the second antenna coil are located between the transmitting coil and the receiving coil.

8. The method according to claim 1, wherein the first mode is a reader/writer mode, the second mode is a card emulation mode, and the third mode is a peer-to-peer mode.

9. The method according to claim 1, wherein the first communication control module comprises a first matching network, a first Near Field Communication (NFC) chip and a first digital controller; and
the first matching network is coupled with the first antenna coil, the first NFC chip is coupled with the first matching network and the first digital controller, respectively, and the first digital controller is configured to control the first NFC chip to start to work in the first mode or the third mode.

10. The method according to claim 1, wherein the second communication control module comprises a second matching network, a second NFC chip and a second digital controller; and
the second matching network is coupled with the second antenna coil, the second NFC chip is coupled with the second matching network and the second digital controller, respectively, and the second digital controller is configured to control the second NFC chip to start to work in the second mode or the third mode.

11. The method according to claim 10, wherein the wireless communication device further comprises a third antenna coil, and the second communication control module further comprises a third matching network and a NFC tag chip;
the third matching network is coupled with the third antenna coil, and the NFC tag chip is coupled with the third matching network and the second digital controller, respectively; and
the NFC tag chip is disabled and the second NFC chip is enabled by the second digital controller when receiving auxiliary electric energy, so that the working mode of the second communication control module is switched from the second mode to the third mode.

12. The method according to claim 10, wherein the second communication control module further comprises a NFC tag chip coupled with the second matching network and the second digital controller, respectively.

13. The method according to claim 12, wherein the second communication control module further comprises a switch coupled with the second matching network, the second NFC chip, the NFC tag chip and the second digital control module, respectively;
when auxiliary electric energy is not received by the second digital controller, the second matching network is connected to the NFC tag chip through the switch; and
when the auxiliary electric energy is received by the second digital controller, the second matching network is connected to the second NFC chip through the switch.

14. A wireless communication device for a wireless power transmission device, comprising a first communication control module, a first antenna coil, a second antenna coil and a second communication control module, the first communication control module is coupled with the first antenna coil, and the second antenna coil is coupled with the second communication control module;
wherein the wireless power transmission device comprises a power transmission control and drive module, a transmitting coil, a receiving coil and a rectification and control module, the power transmission control and drive module is coupled with the transmitting coil, the transmitting coil and the receiving coil are loosely coupled, the receiving coil is coupled with the rectification and control module, and the second communication control module is coupled with the rectification and control module;
wherein the second communication control module is configured to start to work in a second mode and output identification information, and the first communication control module is configured to start to work in a first mode, receive the identification information and determine whether the identification information is the same as first preset information;
wherein when the identification information is the same as the first preset information, both a working mode of the first communication control module and a working mode of the second communication control module are switched to a third mode, and wireless communication is performed by the first communication control module and the second communication control module to transmit data; and
when the wireless communication is performed by the first communication control module and the second communication control module, wireless power transmission is performed by the power transmission control and drive module and the rectification and control module with a first preset power through the transmitting coil and the receiving coil.

15. The wireless communication device according to claim 14, wherein when the identification information is the same as the first preset information and auxiliary electric energy is received by the second communication control module, the working mode of the second communication control module is switched from the second mode to the third mode, and the working mode of the first communication control module is switched from the first mode to the third mode after a first preset duration delayed relative to the second communication control module.

16. The wireless communication device according to claim 15, wherein when the identification information is the same as the first preset information and the auxiliary electric energy is received by the second communication control module, second preset information is sent to the second communication control module by the first communication control module; and
when the second preset information is received by the second communication control module, the working mode of the second communication control module is switched from the second mode to the third mode, and the working mode of the first communication control module is switched from the first mode to the third mode after a first preset duration delayed relative to the second communication control module.

17. The wireless communication device according to claim 14, wherein when the identification information is the same as the first preset information and auxiliary electric energy is received by the second communication control module, the identification information is updated to third preset information by the second communication control module; and
when the third preset information is read by the first communication control module, the working mode of the first communication control module is switched from the first mode to the third mode, and the working mode of the second communication control module is switched from the second mode to the third mode after a second preset duration delayed relative to the first communication control module.

18. The wireless communication device according to claim 15, wherein energy is transferred to a battery pack by the wireless power transmission device, and the battery pack is coupled with the rectification and control module and the second communication control module, respectively;
when a voltage of the battery pack is higher than or equal to a first preset voltage, the auxiliary electric energy is provided to the second communication control module through the battery pack; and
when the voltage of the battery pack is lower than the first preset voltage, the wireless power transmission is performed by the power transmission control and drive module and the rectification and control module with a second preset power through the transmitting coil and the receiving coil, and the auxiliary electric energy is provided to the second communication control module through the rectification and control module;
wherein the second preset power is lower than the first preset power.

19. The wireless communication device according to claim 15, wherein the wireless power transmission is performed by the power transmission control and drive module and the rectification and control module with a second preset power through the transmitting coil and the receiving coil, and the auxiliary electric energy is provided to the second communication control module through the rectification and control module; and
wherein the second preset power is lower than the first preset power.

20. The wireless communication device according to claim 14, wherein the first antenna coil is arranged at a side of the transmitting coil, the second antenna coil is arranged at a side of the receiving coil, and the first antenna coil and the second antenna coil are located between the transmitting coil and the receiving coil.

21. The wireless communication device according to claim 14, wherein the first mode is a reader/writer mode, the second mode is a card emulation mode, and the third mode is a peer-to-peer mode.

22. The wireless communication device according to claim 14, wherein the first communication control module comprises a first matching network, a first Near Field Communication (NFC) chip and a first digital controller; and
the first matching network is coupled with the first antenna coil, the first NFC chip is coupled with the first matching network and the first digital controller, respectively, and the first digital controller is configured to control the first NFC chip to start to work in the first mode or the third mode.

23. The wireless communication device according to claim 14, wherein the second communication control module comprises a second matching network, a second NFC chip and a second digital controller; and
the second matching network is coupled with the second antenna coil, the second NFC chip is coupled with the second matching network and the second digital controller, respectively, and the second digital controller is configured to control the second NFC chip to start to work in the second mode or the third mode.

24. The wireless communication device according to claim 23, wherein the wireless communication device further comprises a third antenna coil, and the second communication control module further comprises a third matching network and a NFC tag chip;
the third matching network is coupled with the third antenna coil, and the NFC tag chip is coupled with the third matching network and the second digital controller, respectively; and
the NFC tag chip is disabled and the second NFC chip is enabled by the second digital controller when receiving auxiliary electric energy, so that the working mode of the second communication control module is switched from the second mode to the third mode.

25. The wireless communication device according to claim 23, wherein the second communication control module further comprises a NFC tag chip coupled with the second matching network and the second digital controller, respectively.

26. The wireless communication device according to claim 25, wherein the second communication control module further comprises a switch coupled with the second matching network, the second NFC chip, the NFC tag chip and the second digital control module, respectively; and
when the auxiliary electric energy is not received by the second digital controller, the second matching network is connected to the NFC tag chip through the switch, and when the auxiliary electric energy is received by the second digital controller, the second matching network is connected to the second NFC chip through the switch.

* * * * *